US012469431B2

(12) United States Patent
Kwon

(10) Patent No.: US 12,469,431 B2
(45) Date of Patent: Nov. 11, 2025

(54) DISPLAY CONTROL METHOD AND DISPLAY CONTROL DEVICE WITH LOW-POWER DRIVING SYSTEM

(71) Applicant: LX SEMICON CO., LTD., Daejeon (KR)

(72) Inventor: You Jin Kwon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 52 days.

(21) Appl. No.: 18/425,659

(22) Filed: Jan. 29, 2024

(65) Prior Publication Data

US 2024/0257702 A1 Aug. 1, 2024

(30) Foreign Application Priority Data

Jan. 30, 2023 (KR) ........................ 10-2023-0011393
Nov. 7, 2023 (KR) ........................ 10-2023-0152337

(51) Int. Cl.
*G09G 3/20* (2006.01)

(52) U.S. Cl.
CPC ....... *G09G 3/2096* (2013.01); *G09G 2310/08* (2013.01); *G09G 2330/021* (2013.01); *G09G 2370/10* (2013.01)

(58) Field of Classification Search
CPC .................................................. G09G 2310/08
See application file for complete search history.

(56) References Cited

U.S. PATENT DOCUMENTS

2011/0164179 A1 7/2011 Funada
2015/0194083 A1 * 7/2015 Sinha ..................... G09G 5/395 345/212
2016/0189621 A1 6/2016 Kim et al.
2018/0075798 A1 * 3/2018 Nho ......................... G09G 3/32

OTHER PUBLICATIONS

Extended European Search Report dated May 15, 2024, issued for the corresponding European patent application No. 24154359.4, 11 pages.

* cited by examiner

*Primary Examiner* — Gustavo Polo
(74) *Attorney, Agent, or Firm* — ROTHWELL, FIGG, ERNST & MANBECK, P.C.

(57) ABSTRACT

Disclosed is a display control method according to embodiments. The display control method includes: transmitting a command for sensing to a driver integrated circuit (DIC); receiving feedback data including a transfer start indicator from the DIC; generating an internal clock signal and shifting a phase of the internal clock signal; checking the transfer start indicator of the feedback data based on the phase-shifted internal clock signal; and repeating receiving the feedback data, generating the internal clock signal, and shifting the phase of the internal clock signal a predetermined number of times. A center value may be determined from among values corresponding to numbers of times that the transfer start indicator is received while repeating the reception, the generation, and the phase shift the predetermined number of times.

20 Claims, 17 Drawing Sheets

FIG. 4

O (shaded) : Center value

| Category | Feedback value 0x3FFH_155H check | | | |
|---|---|---|---|---|
| Try | S-DIC4 | S-DIC3 | S-DIC2 | S-DIC1 |
| 1 | X | X | X | X |
| 2 | X | X | X | X |
| 3 | X | X | X | X |
| 4 | O | X | X | X |
| 5 | O | X | X | X |
| 6 | O | O | X | X |
| 7 | O | O | X | X |
| 8 | O | O | O | X |
| 9 | O | O | O | X |
| 10 | O | O | O | O |
| 11 | O (shaded) | O | O | O |
| 12 | O | O | O | O |
| 13 | O | O (shaded) | O | O |
| 14 | O | O | O | O |
| 15 | O | O | O (shaded) | O |
| 16 | O | O | O | O |
| 17 | O | O | O | O (shaded) |
| 18 | O | O | O | O |
| 19 | X | O | O | O |
| 20 | X | O | O | O |
| 21 | X | X | O | O |
| 22 | X | X | O | O |
| 23 | X | X | X | O |
| 24 | X | X | X | O |
| 25 | X | X | X | X |
| 26 | X | X | X | X |

B. 3 PCLK Mode (73.3 ~ 90MHz)

- BCLK Input / Output

- Output according to BLCK Input (Phase Shift)

1UI Phase = 360 degrees / 26

| TX_DIN_BCLK<25:0> | Internal ADC Clock (73.3 ~ 90MHz) | Phase(UI) shift |
|---|---|---|
| 000FFFFF, 03FFE000, 0000007F | 20UI 19UI | - |
| 001FFFFE, 03FFC000, 000000FF | | 1UI |
| 003FFFFC, 03FF8000, 000001FF | | 2UI |
| ⋮ | ⋮ | ⋮ |
| 03F80000, 00001FFF, 03FFFFC0 | | 19UI |
| 03F00001, 00003FFF, 03FFFF80 | | 20UI |
| 03E00003, 00007FFF, 03FFFF00 | | 21UI |
| ⋮ | ⋮ | ⋮ |
| 0003FFF, 03FFF800, 0300001F | | 38UI |
| 0007FFF, 03FFF000, 0200003F | | 39UI |

D. 5PCLK Mode (44 ~ 54MHz)

- BCLK Input / Output

- Output according to BLCK Input (Phase Shift)

1UI Phase = 360 degrees / 26

| TX_DIN_BCLK<25:0> | Internal ADC Clock (43 ~ 54MHz) | Phase(UI) shift |
|---|---|---|
| 03FFFFFF, 0000007F, 03FFE000, 000FFFFF, 00000000 | 33UI 32UI | - |
| 03FFFFFE, 000000FF, 03FFC000, 001FFFFF, 00000000 | | 1UI |
| 03FFFFFC, 000001FF, 03FFC000, 003FFFFF, 00000000 | | 2UI |
| ⋮ | ⋮ | ⋮ |
| 00000000, 03FFFFC0, 00001FFF, 03F80000, 03FFFFFF | | 32UI |
| 00000001, 03FFFF80, 00003FFF, 03F00000, 03FFFFFF | | 33UI |
| 00000003, 03FFFF00, 00007FFF, 03E00000, 03FFFFFF | | 33UI |
| ⋮ | ⋮ | ⋮ |
| 03FFFFFF, 0000001F, 03FFF800, 00003FFF, 03000000 | | 64UI |
| 03FFFFFF, 0000003F, 03FFF000, 0007FFFF, 02000000 | | 65UI |

- ADC data transfer structure

| Zero | Transfer start | | ADC-data (2400 bits) | | | | Q data |
|---|---|---|---|---|---|---|---|
| 10 bits | 1111111111 | 0101010101 | CH1. D0~D9 | CH2. D0~D9 | ... | CH240. D0~D9 | 80 bits |
| | 3FFH | 155H | | | | | |

- Q data transfer structure

| Q data | | | | |
|---|---|---|---|---|
| RTAS-data (80 bits) | | | | |
| Dummy CH1 D0~D9 | Dummy CH2 D0~D9 | ... | Dummy CH7 D0~D9 | Dummy CH8 D0~D9 |

FIG. 17

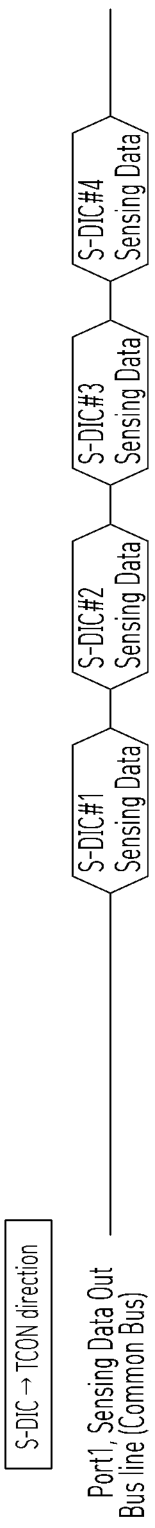

| | | | | | | |
|---|---|---|---|---|---|---|
| Port1, Source Drive IC_#1 Sensing Bus Out | Hi-Z state | Hi-Z state | Hi-Z state | Hi-Z state | Sensing Data Out | Hi-Z state |
| Port1, Source Drive IC_#2 Sensing Bus Out | Hi-Z state | Hi-Z state | Hi-Z state | Sensing Data Out | Hi-Z state | Hi-Z state |
| Port1, Source Drive IC_#3 Sensing Bus Out | Hi-Z state | Hi-Z state | Sensing Data Out | Hi-Z state | Hi-Z state | Hi-Z state |
| Port1, Source Drive IC_#4 Sensing Bus Out | Hi-Z state | Sensing Data Out | Hi-Z state | Hi-Z state | Hi-Z state | Hi-Z state |

Hi-Z state: No output state

DISPLAY CONTROL METHOD AND DISPLAY CONTROL DEVICE WITH LOW-POWER DRIVING SYSTEM

This application claims the benefit and priority of Korean Patent Application Nos. 10-2023-0011393 filed on Jan. 30, 2023, and 10-2023-0152337 filed on Nov. 7, 2023, which are hereby incorporated by references in their entirety as if fully set forth herein.

BACKGROUND

Technical Field

Embodiments are related to a display control method and display control device.

Discussion of the Related Art

A display device includes a timing controller, source driver, and display panel. The timing controller may be designed to provide display data, control data, and clocks for display in the form of packets to the source driver. The source driver may receive the display data and provide source signals related to the display data to the display panel. The display panel may display a screen corresponding to the source signals.

The adoption of technologies to reduce power consumption is required in the display device, and active consideration is being given to technologies to reduce power consumption at the timing controller and source driver.

The source driver of the display device may have a structure for unique charge sharing connections or all charge sharing connections to output the source signals.

Therefore, the display device needs to be designed to provide options for reducing power consumption at the source driver that operate based on various packet types.

SUMMARY

Accordingly, the present disclosure is directed to a display control method and display control device that substantially obviates one or more problems due to limitations and disadvantages of the related art.

In embodiments, there are provided a low-power driving system and timing controller for display devices.

In embodiments, there are provided a driving method for reducing the complexity and cost of display panel design.

In embodiments, there are provided driving timings for controlling a display accurately and efficiently.

However, the objects that could be achieved with the present disclosure are not limited to what has been particularly described hereinabove, and the scope of embodiments may be expanded to other technical challenges capable of being inferred by those skilled in the art based on the entire disclosure provided.

To achieve these objects and other advantages and in accordance with the purpose of the disclosure, as embodied and broadly described herein, provided is a display control method according to embodiments. The display control method includes: transmitting a command for sensing to a driver integrated circuit (DIC); receiving feedback data including a transfer start indicator from the DIC; generating an internal clock signal and shifting a phase of the internal clock signal; checking the transfer start indicator of the feedback data based on the phase-shifted internal clock signal; and repeating receiving the feedback data, generating the internal clock signal, and shifting the phase of the internal clock signal a predetermined number of times. A center value may be determined from among values corresponding to numbers of times that the transfer start indicator is received while repeating the reception, the generation, and the phase shift the predetermined number of times.

It is to be understood that both the foregoing general description and the following detailed description of the present disclosure are exemplary and explanatory and are intended to provide further explanation of the disclosure as claimed.

The present disclosure has the following effects.

A method and device according to embodiments may reduce the complexity of panel components and simplify the process of handling timing signals.

The method and device according to the embodiments may effectively reduce the manufacturing cost of display panels.

The method and device according to the embodiments may provide a universally applicable automatic display control method, ranging from small panels to large panels.

The method and device according to the embodiments may reduce separate setup procedures for the driving display control device.

BRIEF DESCRIPTION OF THE DRAWINGS

The accompanying drawings, which are included to provide a further understanding of embodiments, illustrate the embodiments of the present disclosure and serve to explain the principles of the embodiments together with the description. For a better understanding of the various embodiments described herein, reference should be made to the following description of the embodiments in conjunction with the following drawings in which like reference numerals refer to corresponding parts throughout the figures.

FIGS. 3 and 4 illustrate examples of automatically tracking an internal clock signal by a display control method and device according to embodiments;

FIGS. 14, 15, 16, and 17 illustrate operations in which a display control device receives DIC sensing data as feedback according to embodiments.

DETAILED DESCRIPTION

Hereinafter, preferred embodiments of the present disclosure will be described in detail, examples of which are shown in the attached drawings. The detailed description below with reference to the attached drawings is intended to explain the preferred embodiments of the present disclosure, rather than representing only embodiments capable of being implemented according to the present disclosure. The following detailed explanation includes specific details to provide a thorough understanding of the embodiments. However, it is evident to those skilled in the art that the embodiments are capable of being practiced without these specific details.

Most of the terms used herein are selected from commonly used terms in the relevant field. However, some terms are arbitrarily chosen by the applicant, and the meanings thereof are detailed in the following description as needed. Therefore, the embodiments should be understood based on the intended meaning of the terms rather than the names or meanings thereof.

Figure 1:
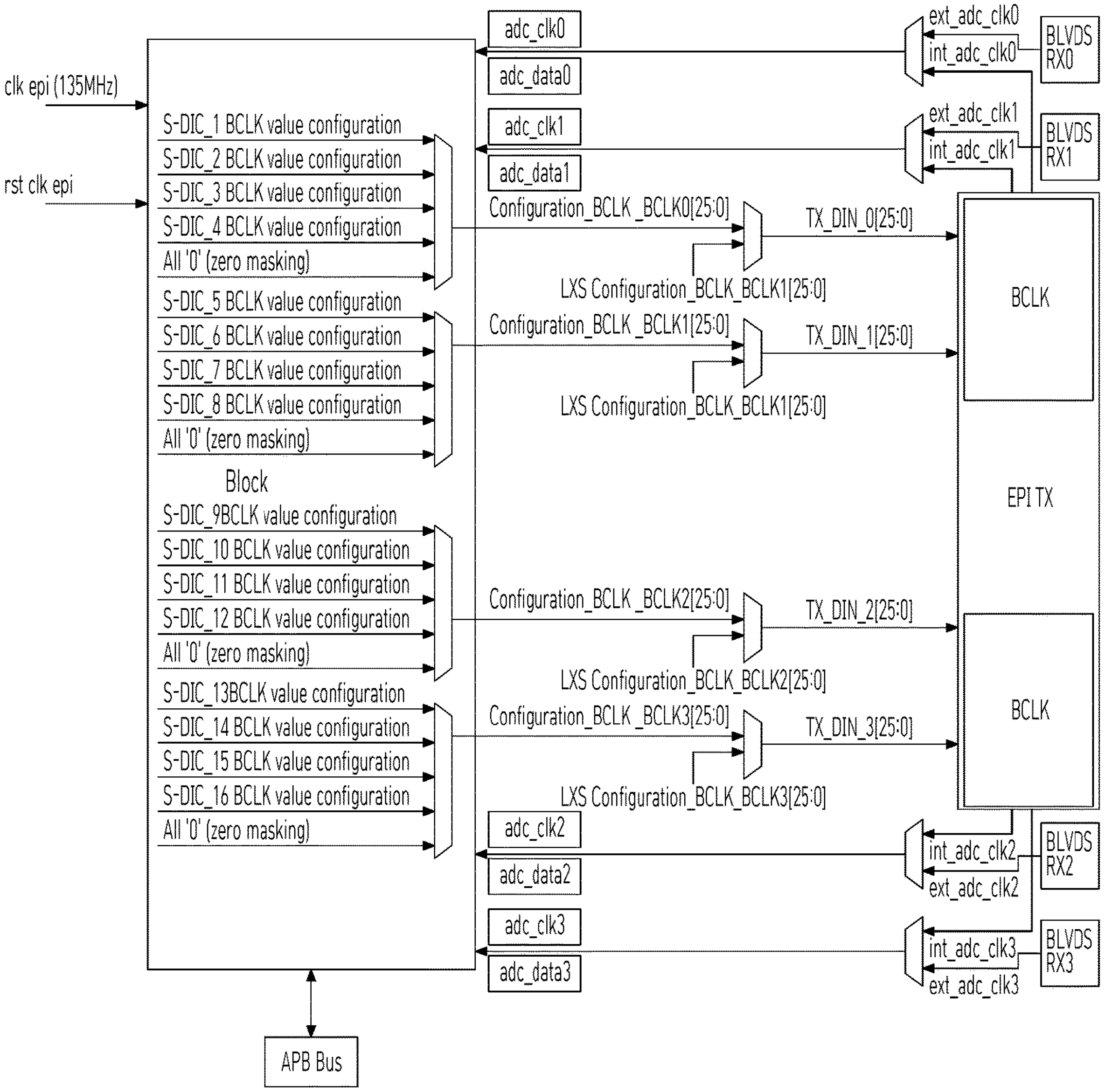
FIG. 1 illustrates a display control device according to embodiments.

FIG. 1 illustrates a display control device according to embodiments.

The display control device according to the embodiments may include a display block and at least one module for transmitting and receiving signals for the display block.

The display control device according to embodiments may refer to a timing controller, a display driver integrated circuit (IC), or a display semiconductor that controls data communication between display driver ICs (DDIs) and improves image quality. The display control device may also be referred to as a T-CON (timing controller).

The phase locked loop (PLL) of the display control device may utilize a clock of 135 MHz. For example, clocks according to embodiments may include various frequencies such as 100, 101, 102, 103, 104, 140, 141, and 142 as well as 135 MHz. Additionally, the PLL of a chip may serialized outside the chip. For example, the speed of a signal output from the chip at 135 MHz may reach 135 MHz*26 unit intervals (UI) (bits), which is 3.510 Gbps. The bit clock (BCLK) of the display control device may generate 2, 3, 4, or 5 pixel clocks (PCLK). A phase shift according to embodiments may be performed, for example, based on 26 steps corresponding to a possible UI value (26 UI (bits)) from the number of bits configured for the interface in the chip. 1UI of phase shifting may be 13.85 degrees. At least one transmission interface (X_DIN_#) may be configured and connected to the path of the display block. A phase shifted analog-to-digital converter (ADC) clock (phase_shifted_adc_clk) for each source driver integrated circuit (S-DIC) may be configured in various ways. A gated clock may be applied. Interrupt-based registers may be configured and applied.

According to embodiments, the configuration of a setup register may be structured as follows: 2 PCLK (110/135 MHz): 1ea, 3 PCLK (73.3/90 MHz): 3ea, 4 PCLK (55/67.5 MHz): 2ea, and 5 PCLK (44/54 MHz): 5ea.

A method and device according to embodiments may control or drive a display using an internal ADC clock (internal ADC CLK) based on a phase shift (int_adc_clk (phase_shifted_adc_clk)). Referring to FIG. 1, the display block may receive a 135 MHz clock signal and/or a reset clock signal (rst_clk). Referring to FIG. 1, the display block may receive a clock signal and/or reset clock signal (rst_clk) of 135 MHz.

A T-CON uses an interface to convert various control information and video data into a format including a clock and transmit the control information and video data in packets. Packets may include clock signals, control information, pixel data, and so on.

The display block may configure S-DIC_1 BCLK to S-DIC_4 BCLK values for four units and generate signals by masking additional components with zero values. The display block may generate four output signals, each of which includes four clocks.

The display control method and device according to the embodiments may receive feedback signals from the driver IC connected to the display control device to perform data transmission and reception on a panel. An increase in the number of driver ICs may potentially lead to feedback burden issues. To address the issues, the method and control device according to the embodiments may efficiently reduce feedback signals. To this end, phase-shifted internal signals (int_adc_clk(phase_shifted_adc_clk)) may be generated. Hereinafter, a method by which the display control device of FIG. 1 operates an internal clock signal (internal ADC CLK) according to embodiments will be described.

Figure 2:
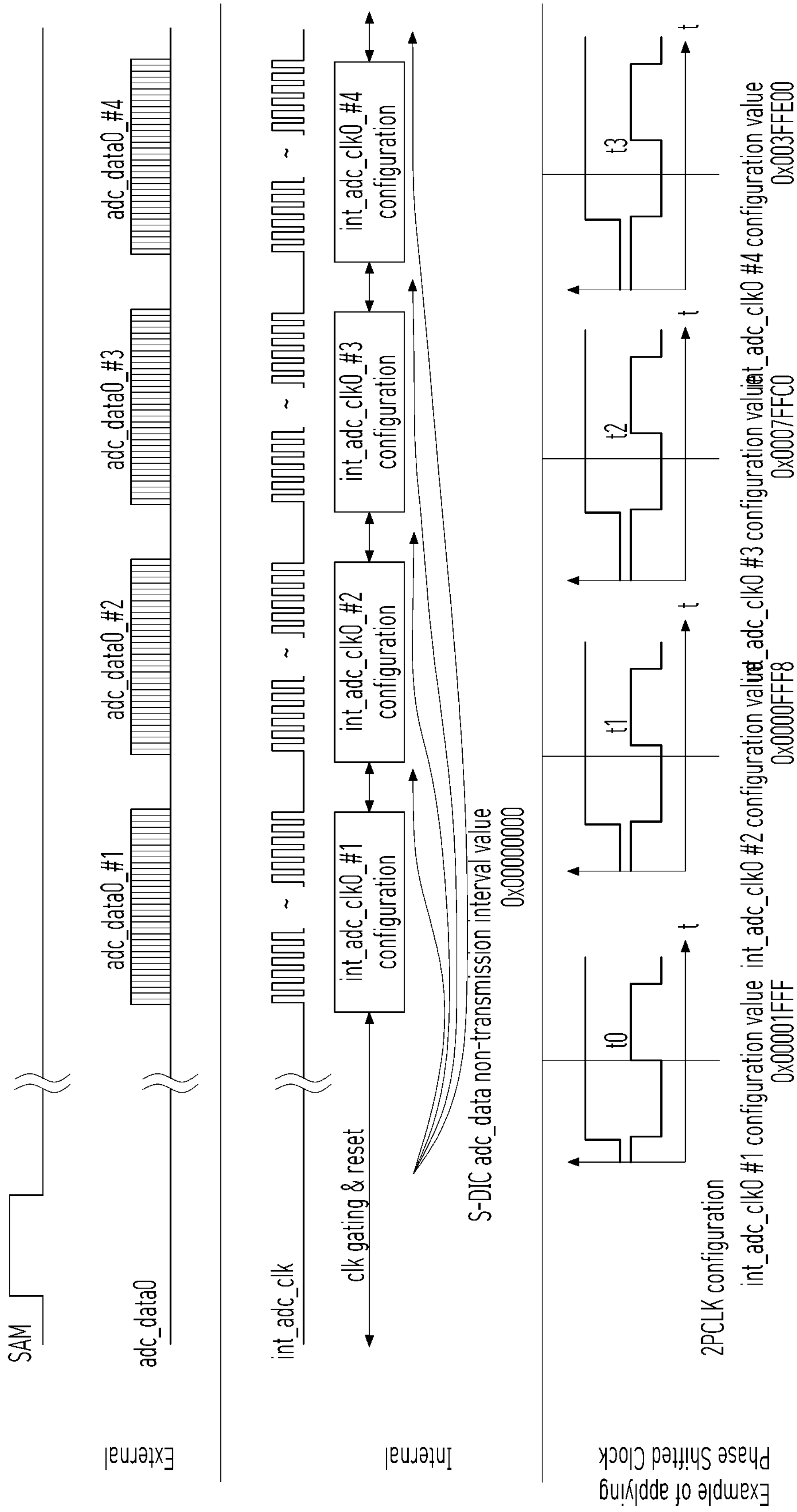
FIG. 2 illustrates internal clock signal control of a display control method and device according to embodiments.

FIG. 2 illustrates internal clock signal control of a display control method and device according to embodiments.

The method and device according to the embodiments may transmit and receive data by internally generating a clock without an external clock signal.

For example, as shown in FIG. 2, when ADC data is being transmitted from outside the display control device, the display control device may generate a clock internally and receive external data based on the internal clock signal. For efficient operation of the internal clock signal, the method/method according to the embodiments may generate and operate a plurality of clock signals by shifting the phase as shown in FIG. 2. FIG. 2 shows, for example, a case where the clock signal is set to 2PCLK. The display control device may generate an int_adc_clk0 #1 setting value (0x00001FFF) and performs a phase shift. The display control device may generate and use signals with an int_adc_ clk0 #2 setting value (0x0000FFF8), an int_adc_clk0 #3 setting value (0x0007FFC0), and an int_adc_clk0 #4 setting value (0x003FFE00). Additionally, the internal clock signal is generated according to the setting values and may have a value of 0x00000000 during an interval where S-DIC adc_data is not transmitted.

Figure 3:
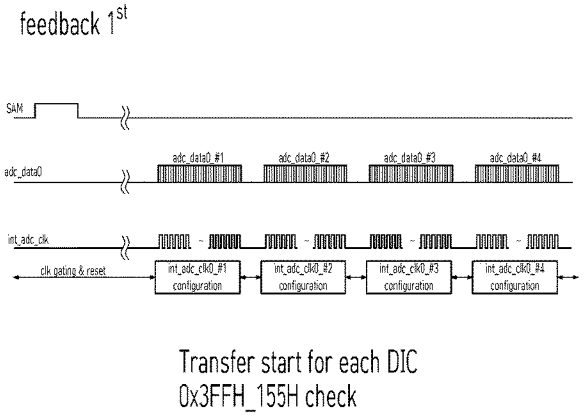
Figure 3:
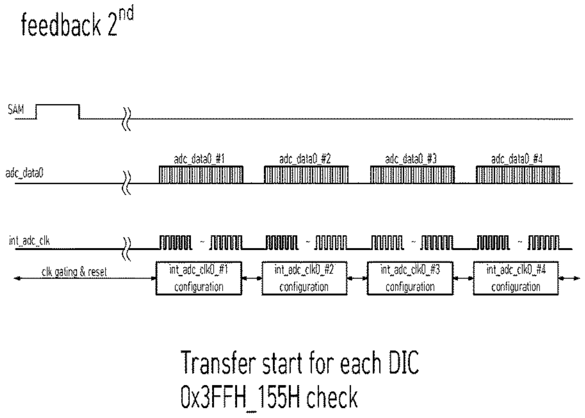
Figure 3:
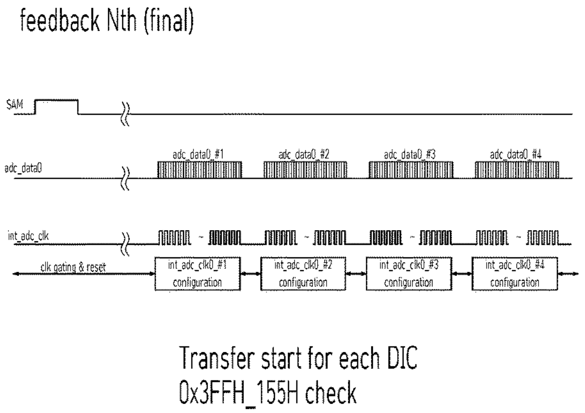

FIGS. 3 and 4 illustrate examples of automatically tracking an internal clock signal by a display control method and device according to embodiments.

By skipping receiving an external clock signal, the display control device of FIG. 1 may reduce implementation complexity and improve integration. As shown in FIG. 2, the display control device generates an internal clock signal and receives data from a DIC. In this case, the display control device may process data transmission and reception based on automatic tracking as shown in FIGS. 3 and 4.

Data is received from each terminal of the DIC connected to the display control device at each transmission time. The display control device may detect and track DIC data based on multiple feedback of the data received at each transmission time without receiving an external clock signal.

The display control device may check whether the feedback value of the received data is, for example, 0x3FFH_155H. If data transmission begins from each DIC, the display control device checks whether the value of the received data is a reference value, for example, 0x3FFH_155H. Since a phase shift may be performed over 26 steps corresponding to the number of UIs of an interface, the display control device may perform feedback checks for the data received from each DIC over 26 steps.

Referring to the table in FIG. 4, if the received feedback value of each of S-DICs 1 to 4 is not the reference value, it is checked as X, and if the received feedback value is the reference value, it is checked as O. The O point indicates that the detection of the center waveform of data is allowed, and this may be viewed as a section where the display control device detects data.

Figure 5:
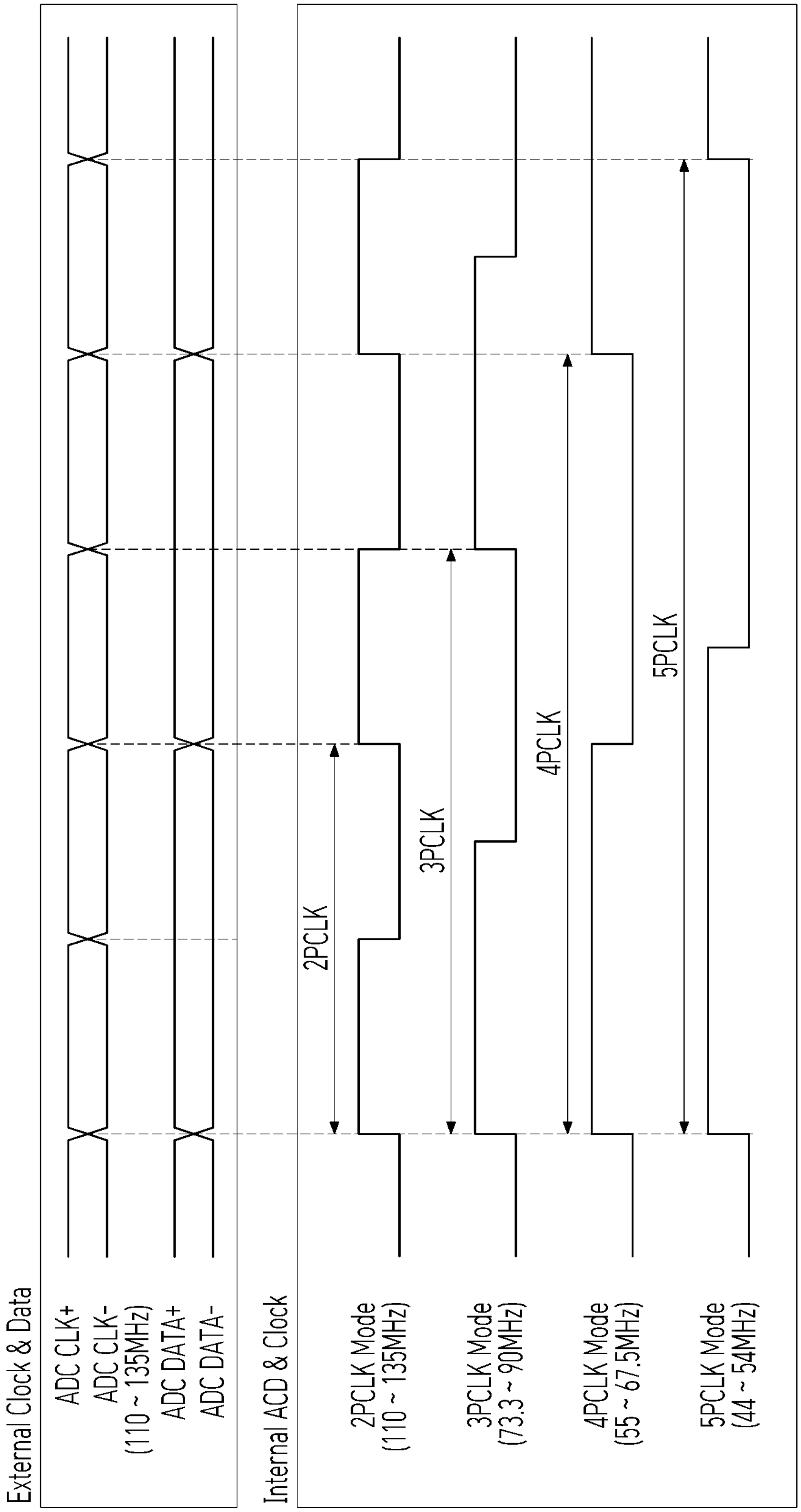
FIG. 5 illustrates a method of generating an internal clock signal according to embodiments.

FIG. 5 illustrates a method of generating an internal clock signal according to embodiments.

The internal clock signal described in FIGS. 1 to 4 may be generated as shown in FIG. 5. Internal clock signal generation modes according to embodiments may include various modes depending on the clock waveform configuration. For example, a first mode 1 (2PCLK) is configured with a frequency of 110 to 135 MHz and generates a clock signal at intervals of two clock cycles. A second mode 1 (3PCLK) is configured with a frequency of 110 to 135 MHz and generates a clock signal at intervals of two clock cycles. A third mode 1 (4PCLK) is configured with a frequency of 55 to 67.5 MHz and generates a clock signal at intervals of four clock cycles. A fourth mode 1 (5LCLK) is configured with a frequency of 44 to 54 MHz and generates a clock signal at intervals of five clock cycles. As shown in FIG. 5, the internal clock signal according to embodiments may support various modes to match the external clock and data of a DIC. The phase shift of the internal clock signal will be explained with reference to FIG. 6.

Figure 6:
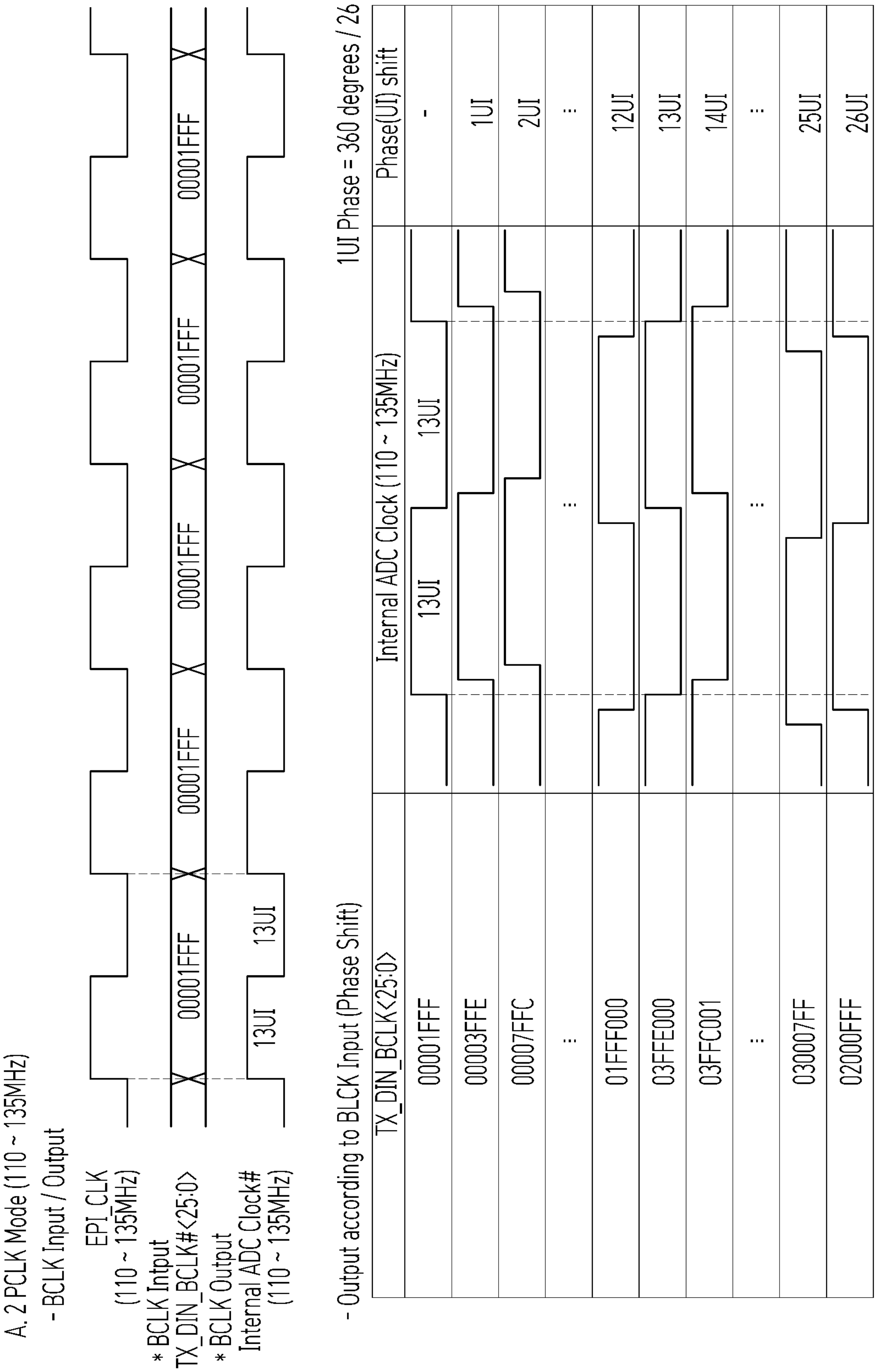
FIG. 6 illustrates a method of generating an internal clock signal according to embodiments.

FIG. 6 illustrates a method of generating an internal clock signal according to embodiments.

FIG. 6 shows in detail the method of generating an internal clock signal based on phase shifting described in FIG. 5.

Specifically, FIG. 6 shows an example of generating an internal clock signal through a 26-step phase shift when the internal clock generation mode according to embodiments is a 2PCLK mode. 1UI, which is the unit of a phase shift, is a value obtained by dividing 360 degrees by 26. The display control device may generate a base clock signal, receive the base clock signal as an input, and shift the base clock signal by 1UI from 1UI to 26UI to output as the internal clock signal. A clock signal for one cycle in FIG. 6 may be composed of 13UI and 13UI.

Figure 7:
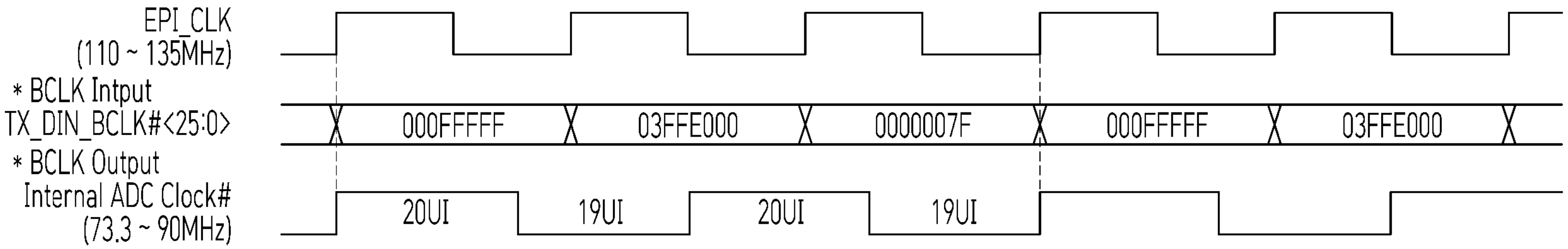
FIG. 7 illustrates a method of generating an internal clock signal according to embodiments.
Figure 7:
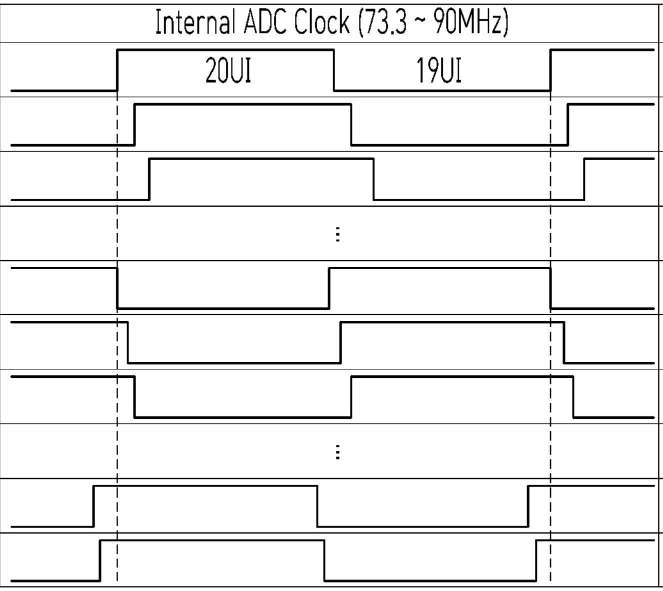

FIG. 7 illustrates a method of generating an internal clock signal according to embodiments.

Specifically, FIG. 7 shows an example of generating an internal clock signal through a 26-step phase shift when the internal clock generation mode according to embodiments is a 3PCLK mode. 1UI, which is the unit of a phase shift, is a value obtained by dividing 360 degrees by 26. The display control device may generate a base clock signal, receive the base clock signal as an input, and shift the base clock signal by 1UI from 1UI to 39UI to output as the internal clock signal. Referring to FIG. 7, unlike FIG. 6, the display control device may also generate the internal clock signal by performing phase shifting from 1UI to 39UI. A clock signal for one cycle in FIG. 7 may be composed of 20UI and 19UI.

Figure 8:
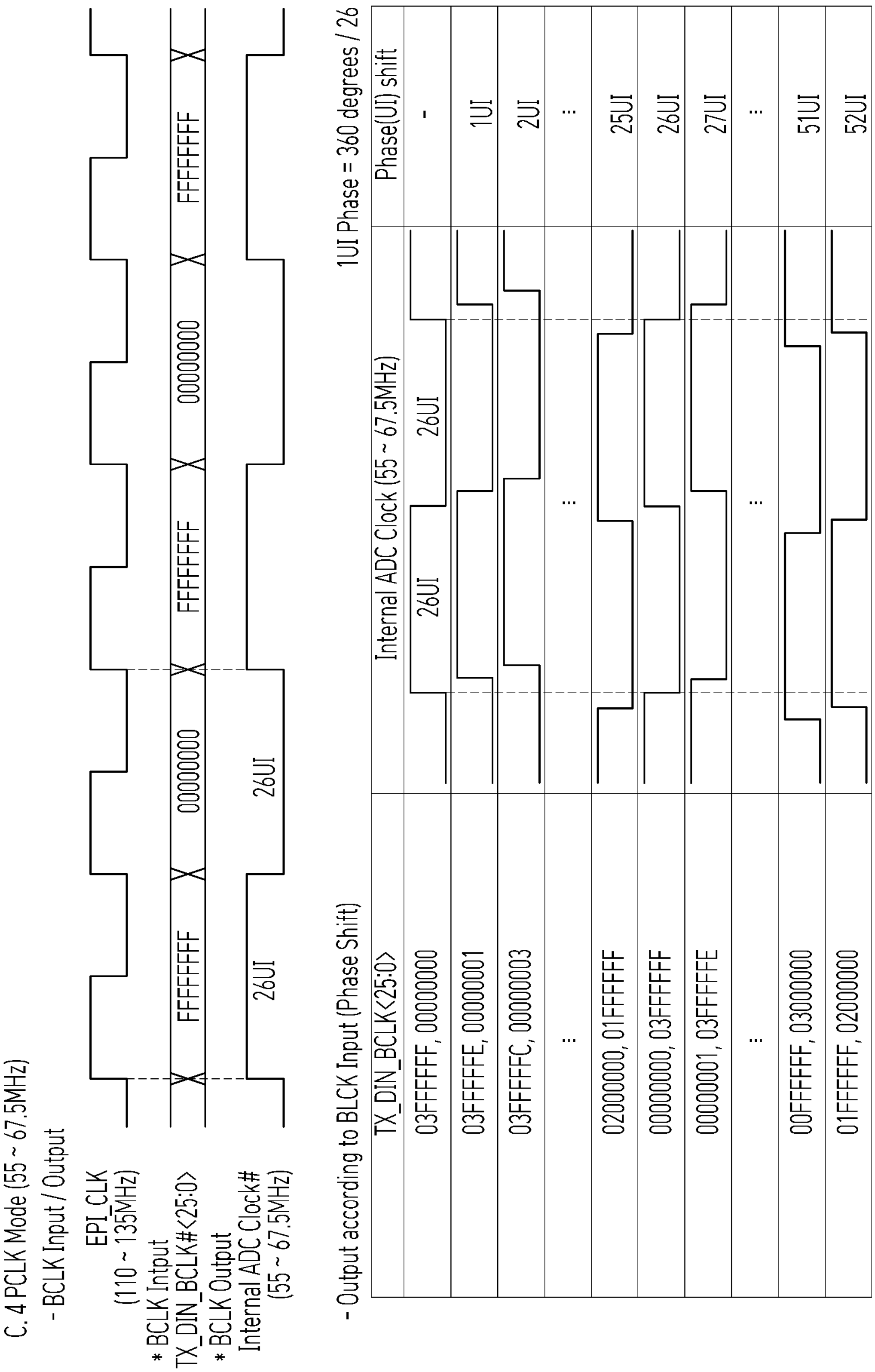
FIG. 8 illustrates a method of generating an internal clock signal according to embodiments.

FIG. 8 illustrates a method of generating an internal clock signal according to embodiments.

Specifically, FIG. 8 shows an example of generating an internal clock signal through a 26-step phase shift when the internal clock generation mode according to embodiments is a 4PCLK mode. 1UI, which is the unit of a phase shift, is a value obtained by dividing 360 degrees by 26. The display control device may generate a base clock signal, receive the base clock signal as an input, and shift the base clock signal by 1UI from 1UI to 52UI to output as the internal clock signal. Referring to FIG. 8, unlike FIG. 7, the display control device may also generate the internal clock signal by performing phase shifting from 1UI to 52UI. A clock signal for one cycle in FIG. 7 may be composed of 26UI and 26UI.

Referring to FIGS. 6 to 8, an internal clock signal may be generated based on at least one of 2PCLK, 3PCLK, 4PCLK, or 5PCLK among clocks of feedback data.

Figure 9:
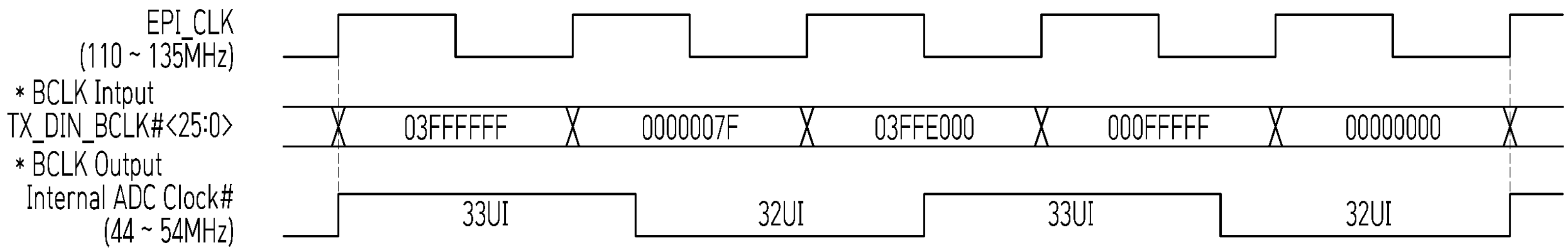
FIG. 9 illustrates a method of generating an internal clock signal according to embodiments.

FIG. 9 illustrates a method of generating an internal clock signal according to embodiments.

Specifically, FIG. 9 shows an example of generating an internal clock signal through a 26-step phase shift when the internal clock generation mode according to embodiments is a 5PCLK mode. 1UI, which is the unit of a phase shift, is a value obtained by dividing 360 degrees by 26. The display control device may generate a base clock signal, receive the base clock signal as an input, and shift the base clock signal by 1UI from 1UI to 65UI to output as the internal clock signal. Referring to FIG. 9, unlike FIG. 8, the display control device may also generate the internal clock signal by performing phase shifting from 1UI to 65UI. A clock signal for one cycle in FIG. 7 may be composed of 33UI and 32UI.

Figure 10:
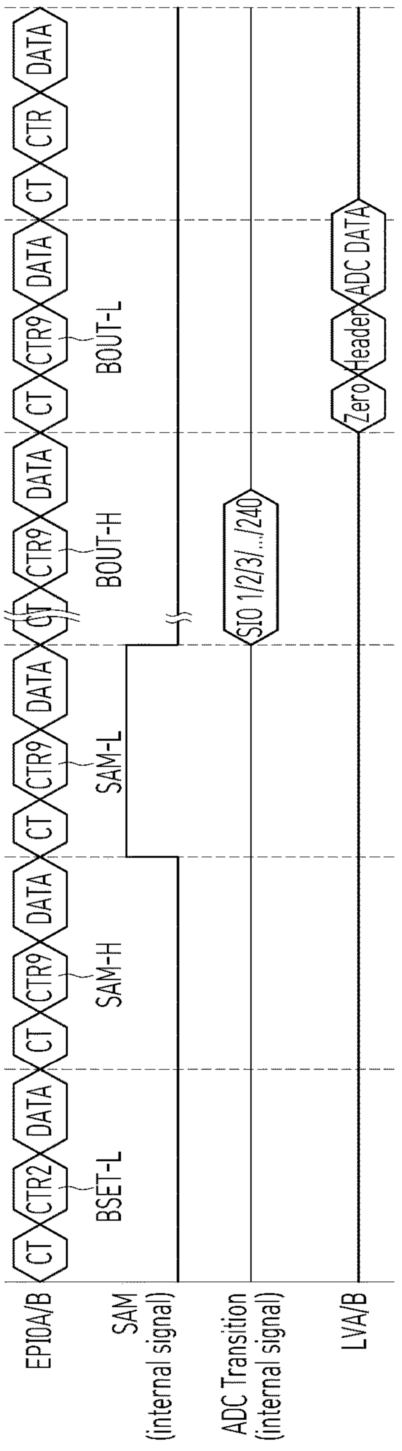
FIG. 10 illustrates the configuration of signals for a display control device according to embodiments.

FIG. 10 illustrates the configuration of signals for a display control device according to embodiments.

Specifically, FIG. 10 shows an ADC signal received by the display control device of FIG. 1 and an ADC data structure of the ADC signal.

The display control device according to the embodiments may receive data from a DIC, and the data may have the structure shown in FIG. 10. ADC data may include a zero part, transfer start part, ADC data part, and Q data part. The transfer start part may include, for example, values of 3FFH and 155H, and as shown in FIGS. 3 and 4, the display control device may monitor the transfer start value of data and track the center value.

Figure 11:
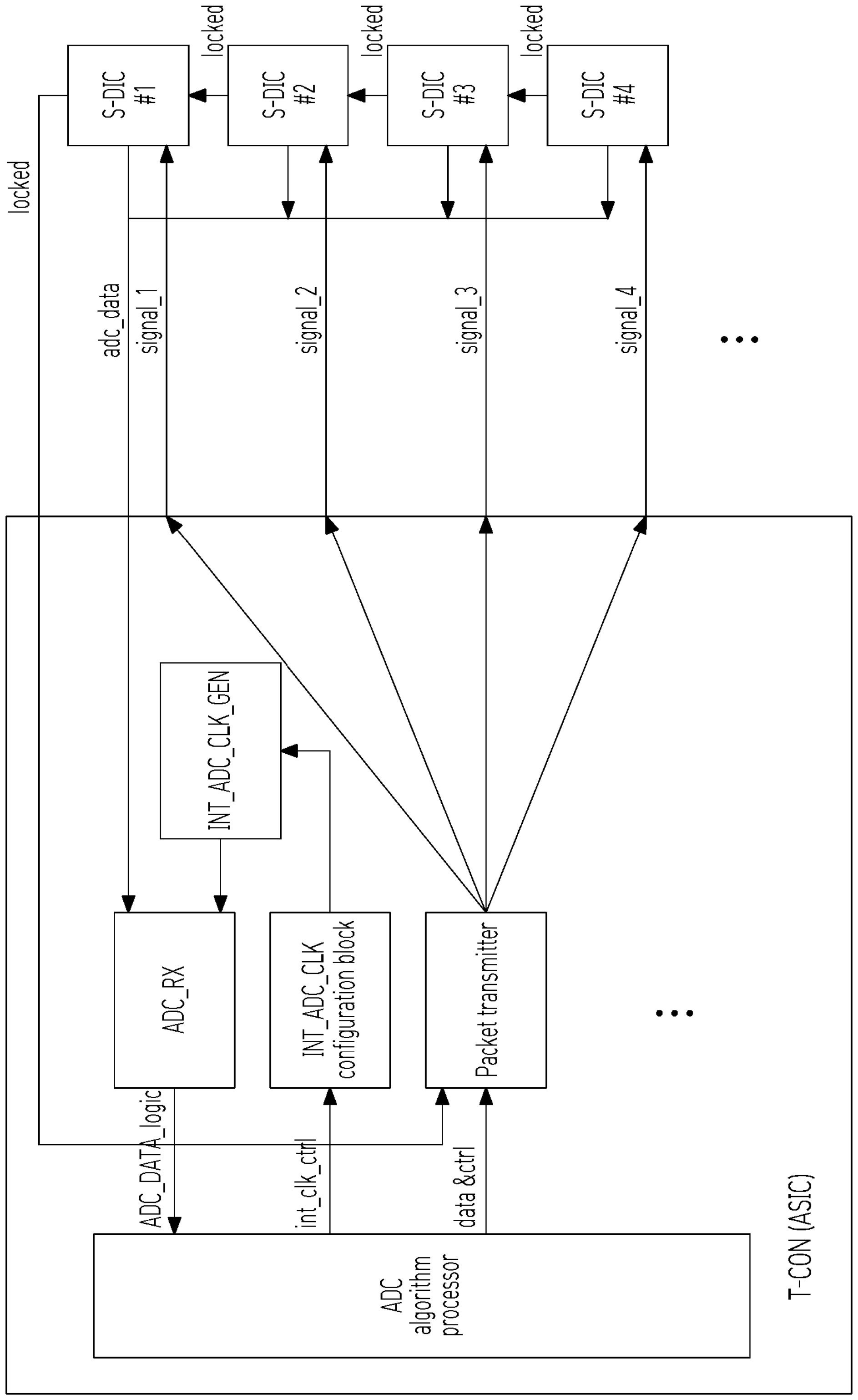
FIG. 11 illustrates a display control device according to embodiments.

FIG. 11 illustrates a display control device according to embodiments.

Specifically, FIG. 11 shows the display control device, the T-CON (application-specific integrated circuit (ASIC)), and the DIC (S-DIC) connected to the T-CON of FIG. 1.

Herein, the display control device may be referred to as the T-CON. The display control device may transmit clock signals and receive ADC data in conjunction with each DIC (S-DIC). The display control device, including an internal ADC clock generator, may generate an internal clock signal and track and detect data received from the DIC using only the internal clock signal, without an external clock signal. The internal ADC clock generator may transmit the internal clock signal to an ADC receiver.

An internal ADC clock configurator may receive an internal clock control signal from an ADC algorithm processor and transmit a configuration signal to the internal ADC clock generator.

The packet transmitter may receive data and/or control signals from the ADC algorithm processor, generate packets based on data and/or control signals, and transmit signals including the packets to each S-DIC. The configuration of an embedded panel interface (EPI) signal is as described in FIG. 10. The packet transmitter may not receive an external clock signal from the S-DIC. Thus, a path for receiving clock signals from the S-DIC may be locked. Instead, more efficiently, the display control device may receive data by accurately detecting the transfer start value of ADC data using multiple feedback procedures, where the ADC data is phase-shifted through the internal ADC clock generator as shown in FIGS. 2 to 9.

The T-CON receives only data from the DIC and does not receive clock signals from the DIC. The T-CON includes a generator for generating an internal clock signal and a receiver for receiving data. The receiver may receive the data based on the internal clock signal.

The display control device (T-CON) includes: a data transmitter configured to transmit a command for sensing to a DIC; a data receiver configured to receive feedback data including a transfer start indicator from the DIC; and an internal clock signal generator configured to generate an internal clock signal and shift a phase of the internal clock signal. The transfer start indicator of the feedback data may be checked based on the phase-shifted internal clock signal. The reception of the feedback data and the phase shift of the internal clock signal may be repeated a predetermined number of times. A center value may be determined from among values corresponding to numbers of times that the transfer start indicator is received while the reception and the phase shift are repeated the predetermined number of times.

Figure 12:
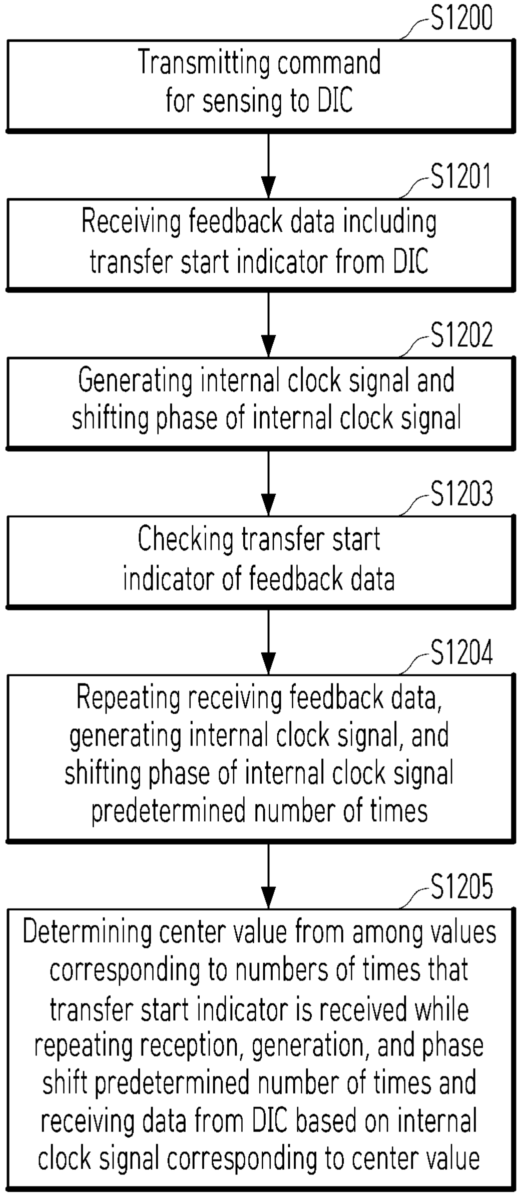
FIG. 12 illustrates a method of controlling a display control device according to embodiments.

FIG. 12 illustrates a method of controlling a display control device according to embodiments.

FIG. 12 shows a flowchart in which the display control device shown in FIGS. 1 and 11 generates an internal clock signal and senses ADC data as shown in FIGS. 2 to 9.

Specifically, FIG. 12 shows a method by which the display control device corresponding to the T-CON generates an internal clock for data reception and controls the internal clock based on centering of the internal clock to receive data from an S-DIC without an external clock. The display control device may configure an internal clock signal during an initial driving mode (referred to as the initial mode) as shown in FIG. 12. The display control device may transition from the initial mode to a normal mode and smoothly receive data from the S-DIC without an external clock signal.

In S1200 of the display control method, the display control device receives a command for sensing to a DIC.

In S1201 of the display control method, the display control device receives feedback data including a transfer start indicator from the DIC.

In S1202 of the display control method, the display control device generates an internal clock signal and shifts the phase of the internal clock signal.

In S1203 of the display control method, the display control device checks the transfer start indicator in the feedback data.

In S1204 of the display control method, the display control device repeats the following operations a predetermined number of times: receiving the feedback data, generating the internal clock signal, and shifting the phase of the internal clock signal.

In S1205 of the display control method, the display control device determines a center value of the numbers of times that the transfer start indicator is received while repeating the operations the predetermined number of times and then receives data from the DIC based on the internal clock signal corresponding to the center value.

In the initial mode, the initial sensing block step generates an ADC sensing data block for transmission to the S-DIC (S1200). This is done to transmit a sensing command to the S-DIC. The signal containing packets shown in FIG. 10 may include a sensing command. For example, the signal may the counter (CDR) of a signal containing packets.

Transmitting the signal containing packets may include transmitting a signal containing packets for receiving each sensing data of the S-DIC. Upon receiving the signal containing packets, the S-DIC may transmit ADC data to an ADC receiver of the display control device. The display control device may receive the ADC data (hereinafter referred to as feedback data) sequentially in time order from 16 S-DICs (S1201). The display control device may generate an internal ADC clock as shown in FIGS. 5 to 9.

The display control method checks the transfer start indicator included in the feedback data (S1203).

In bit shifting, a TX_DIN_BCLK signal, which is the internal ADC clock (BCLK) is shifted by 1UI (S1204). A first internal ADC clock is phase-shifted by 1UI. The packet transmitter transmits a signal containing packets with sensing commands to the S-DICs and, in response, receives ADC data from the S-DICs as feedback. The display control device shifts an internal ADC clock signal by 2UI (S1205) (this operation is repeated). The display control device then transmits sensing commands again and receives ADC data in response. The display control device shifts an internal ADC clock signal by 3UI. The display control device transmits sensing commands and receives ADC data, repeating this process N times. N may be, for example, 26 times, and the value of N may vary depending on the internal clock mode according to the specifications. When the display control device receives N-th feedback data, the display control device checks if the transfer start value of the data has a specific value, for example, 3FFH155H (S1203). To track the optimized best value, the display control device checks the N value and verifies the center value.

According to the display control method, the initial mode for determining the center value of the internal clock signal transitions to the normal mode after finding the center value. In the normal mode, data is received from the DIC based on the internal clock signal corresponding to the center value without an external clock signal.

The phase of the internal clock signal is shifted by an angle obtained by dividing 360 degrees by a value corresponding to a predetermined number of times. The feedback data is received each time the phase of the internal clock signal is shifted. The center value of the internal clock signal is checked by checking whether there is a value in the transfer start indicator each time the feedback data is received.

To check and find the center value of the internal clock signal, the display control device repeats the reception of the feedback data a predetermined number of times as many as the possible number of UIs, which are signal bits of the display control device. If the signal bits of the interface are 26UI (bits), the display control device performs the feedback process 26 times to check the center value of the internal clock signal.

Figure 13:
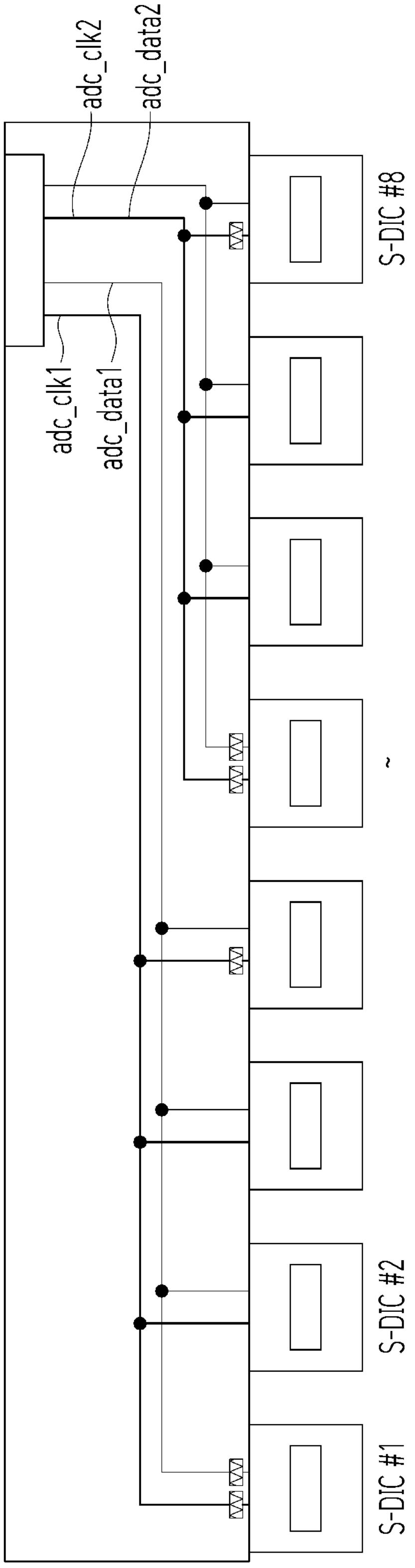
FIG. 13 illustrates the structure of a display control device and driver integrated circuit (DIC) according to embodiments.
Figure 14:
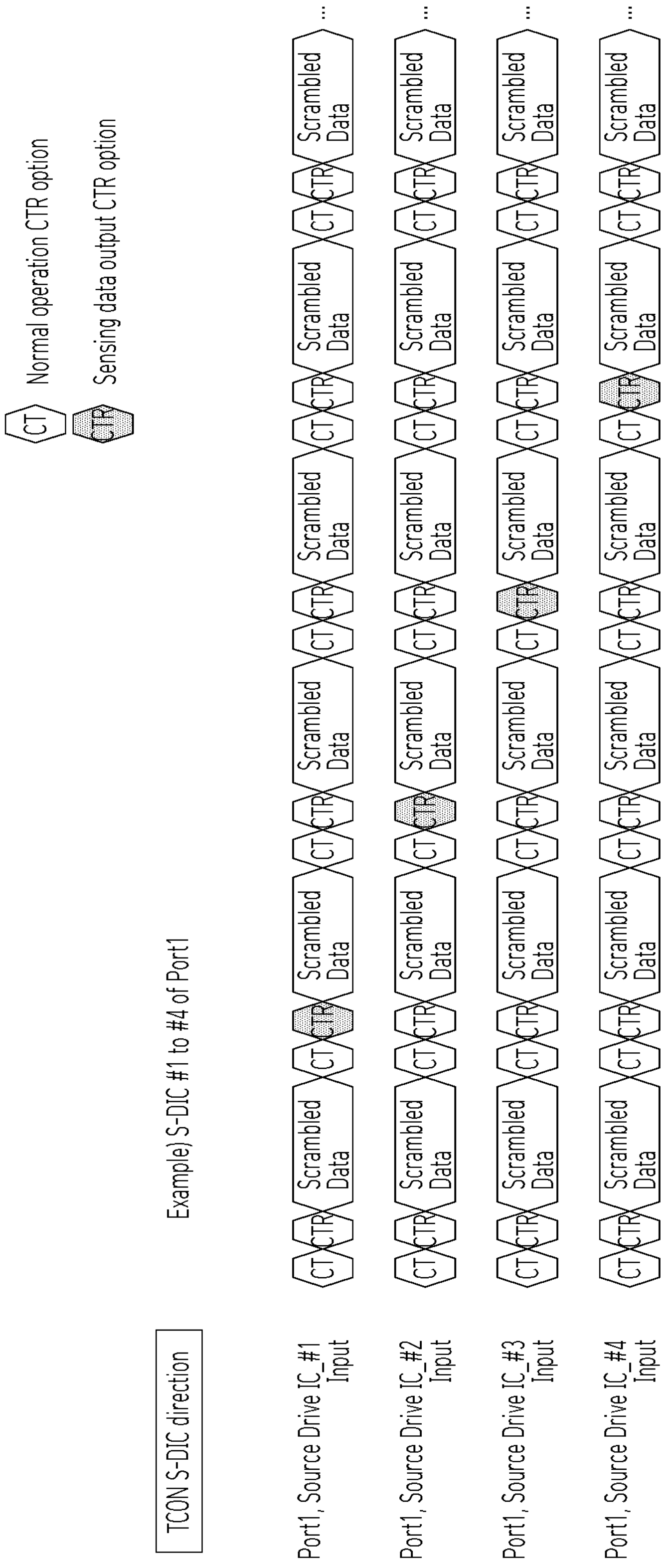
Figure 15:
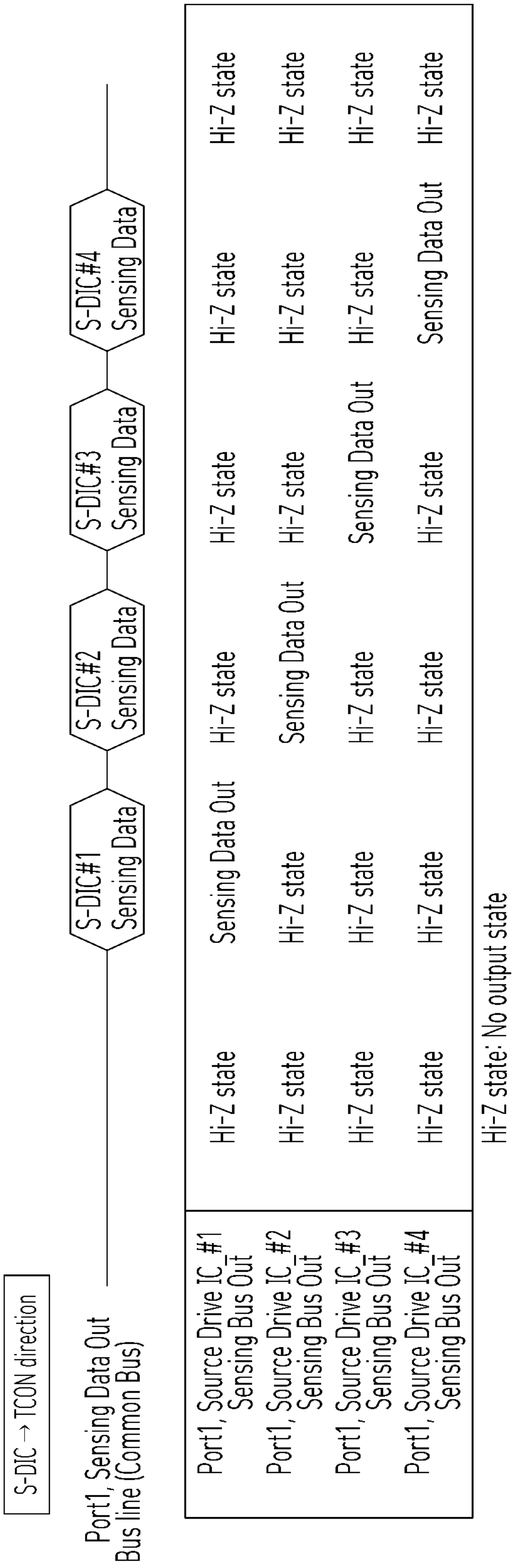
Figure 16:
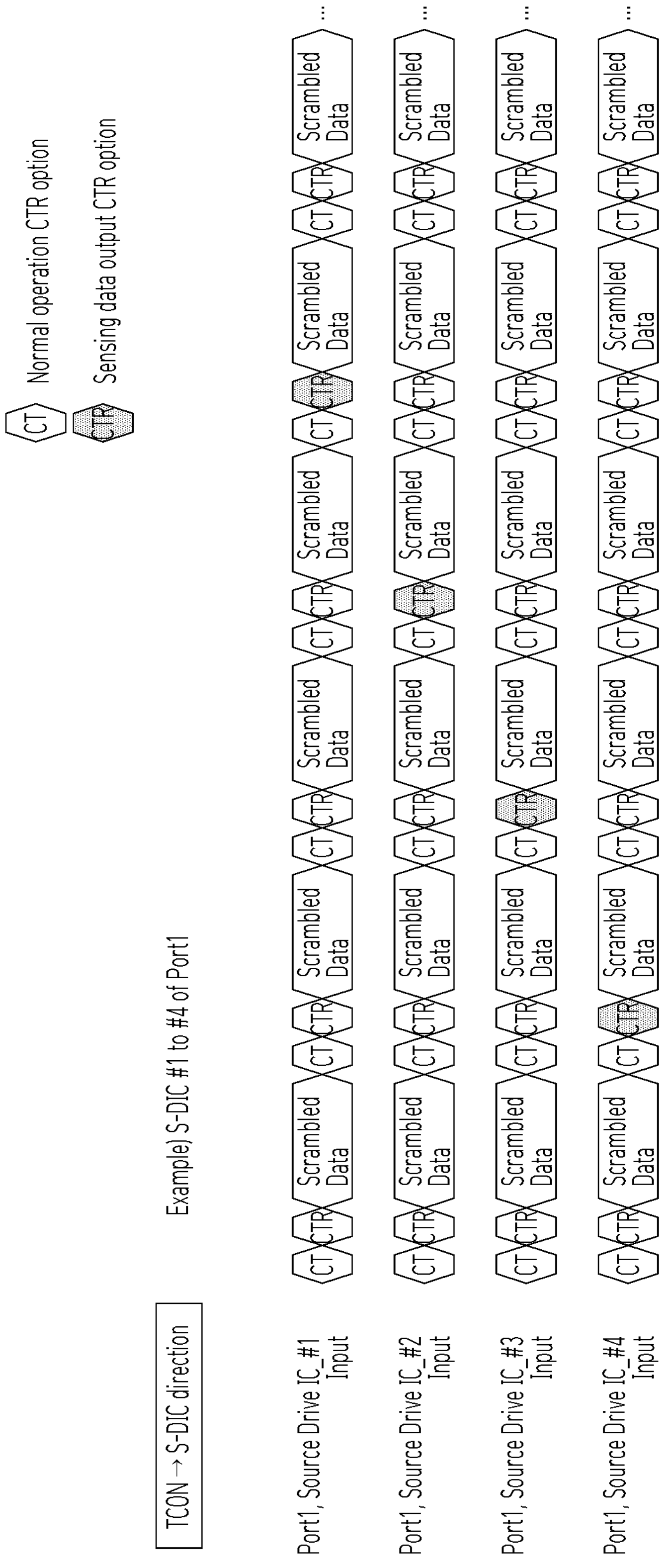

FIG. 13 illustrates the structure of a display control device and DIC according to embodiments.

Specifically, FIG. 13 illustrates the structure of FIG. 11. FIG. 13 shows an example in which a data path between an S-DIC and T-CON includes both a path for receiving ADC data and a path for receiving an ADC clock. However, according to the above-described embodiments, a path for receiving an external ADC clock is unnecessary. That is, the T-CON may internally generate its own clock, shift the phase thereof, receive only data from the S-DIC as feedback, and thereby track and sense ADC data. In summary, the T-CON does not rely on external clocks and is capable of automatically aligning an ADC data centering clock. Thus, the T-CON is universally applicable from small panels to large panels and may effectively reduce panel costs.

FIGS. 14, 15, 16, and 17 illustrate operations in which a display control device receives DIC sensing data as feedback according to embodiments.

The display control device corresponding to a T-CON may transmit a signal containing packets including a CTR signal related to sensing commands sequentially to an S-DIC as shown in FIGS. 14 to 17. The S-DIC may vary in specification, but for example, when the S-DIC consists of 16 DIC terminals, each output terminal may respond sequentially to the sensing commands and return sensing data (ADC data) to the T-CON.

To receive ADC data without an S-DIC clock signal, the T-CON applies a phase-shifted internal clock and transmits an initial sensing command to the S-DIC. The T-CON receives a transfer start value (referred to as the transfer start indicator) (for example, 3FF4155H of FIG. 10) in feedback data and then generates an internal clock signal by shifting the phase of the internal clock by 1UI each for multiple times (e.g., 26 times). Based on the internal clock, the T-CON repeats the sensing and response process to repeatedly receive the feedback data. The T-CON finds the center value of the internal clock through indicator detection. Since 16 data from the S-DIC are received at each transmission time, the center waveforms of the received data are detected at different time points. Therefore, by detecting the feedback data based on the internal clock multiple times, the best value for the data reception may be optimized.

Accordingly, the method and device according to the embodiments may reduce the complexity of panel components and simplify the process of handling timing signals. The method and device according to the embodiments may effectively reduce the manufacturing cost of display panels. The method and device according to the embodiments may provide a universally applicable automatic display control method, ranging from small panels to large panels. The method and device according to the embodiments may reduce separate setup procedures for driving the display control device.

The embodiments have been described from the perspectives of the method and/or device, and the description of the method and device may be mutually complementary and applicable.

While each drawing has been explained separately for the sake of clarity, it is also possible to design new embodiments by combining the embodiments illustrated in each drawing. Designing a computer-readable recording medium having recorded thereon a program for executing the above-described embodiments as needed by an ordinary skilled person falls within the scope of the present disclosure. The device and method according to the embodiments are not limited to the configurations and methods in the above-described embodiments. Instead, the embodiments may be selectively combined in whole or in part to allow for various modifications. While preferred embodiments of the present disclosure have been illustrated and explained, the present disclosure is not limited to the specific embodiments described above. In addition, those skilled in the art will appreciate that various modifications may be made in the embodiments without departing from the essence of the embodiments claimed in the claims. These variations should not be individually understood apart from the technical concept or perspective of the embodiments.

Various components of the device according to the embodiments may be implemented by hardware, software, firmware, or a combination thereof. Various components of the embodiments may be implemented as a single chip such as a hardware circuit, for example. According to embodiments, the components of the embodiments may be implemented as separate chips In this document, "/" and "," are interpreted as "and/or." For example, "A/B" is interpreted as "A and/or B," and "A, B" is interpreted as "A and/or B." In addition, "A/B/C" means "at least one of A, B, and/or C." Similarly, "A, B, C" also means "at least one of A, B, and/or C." Furthermore, "or" is interpreted as "and/or." For example, "A or B" may mean: 1) "A" only, 2) "B" only, or 3) "A and B." In other words, "or" in this document may mean "additionally or alternatively."

Terms such as "first" and "second" may be used to describe various components of the embodiments. However, the various components according to the embodiments should not be limited by the interpretation of these terms. These terms are merely used to distinguish one component from another. For example, a first user input signal and a second user input signal are both user input signals, but unless clearly indicated in context, the first user input signal and second user input signal do not refer to the same user input signals.

The terms used to describe the embodiments are used for the purpose of describing specific embodiments. In other words, the terms are not intended to limit the embodiments. As described in the embodiments and claims, the singular form is intended to encompass the plural unless explicitly specified in context. The "and/or" expression is used to mean all possible combinations of terms. The terms such as "includes" or "comprises" are used to describe the presence of features, numbers, steps, elements, and/or components and does not imply the exclusion of additional features, numbers, steps, elements, and/or components. Condition expressions such as "if" and "when" used to describe embodiments are not limited to optional cases but are intended to be interpreted to mean that when specific conditions are satisfied, related operations or definitions are performed or interpreted.

The operations according to embodiments described in this document may be performed by a transmitting/receiving device, which includes a memory and/or a processor according to embodiments. The memory may store programs for performing/controlling the operations according to the embodiments, and the processor may control various operations described in this document. The processor may also be referred to as a controller. The operations according to the embodiments may be performed by firmware, software, and/or a combination thereof. The firmware, software, and/or combination thereof may be stored in the processor or memory. On the other hand, the operations according to the embodiments may also be performed by a transmitting device and/or a receiving device according to embodiments. The transmitting/receiving device may include a transceiver for transmitting and receiving media data, a memory for storing instructions (e.g., program code, algorithms, flowcharts, and/or data) for processes according to embodiments, and a processor for controlling the operations of the transmitting/receiving device.

What is claimed is:

1. A display control method comprising:

transmitting a command for sensing to a driver integrated circuit (DIC);

receiving feedback data including a transfer start indicator from the DIC;

generating an internal clock signal;

shifting a phase of the internal clock signal;

checking the transfer start indicator of the feedback data based on the phase-shifted internal clock signal; and repeating, for a predetermined number of times, receiving the feedback data, generating the internal clock signal, and shifting the phase of the internal clock signal, wherein a center value of the internal clock signal is determined from among values corresponding to a number of times that the transfer start indicator is received during the repetition of, the reception, the generation, and the phase shift, for the predetermined number of times.

2. The display control method of claim 1, wherein an initial mode for determining the center value of the internal clock signal transitions to a normal mode after the determination of the center value, and wherein the display control method further comprises receiving data from the DIC based on the internal clock signal corresponding to the center value in the normal mode without an external clock signal.

3. The display control method of claim 1, wherein the phase of the internal clock signal is shifted by an angle obtained by dividing 360 degrees by a value corresponding to the predetermined number of times, wherein the value of the predetermined number of times is determined based on a number of bits for an interface, wherein the feedback data is received each time the phase of the internal clock signal is shifted, and wherein the center value of the internal clock signal is checked by checking whether there is a value in the transfer start indicator each time the feedback data is received.

4. The display control method of claim 1, wherein a timing controller receives only data from the DIC and does not receive clock signals from the DIC, wherein the timing controller comprises:

a generator configured to generate the internal clock signal;

and a receiver configured to receive the data from the DIC, and wherein the receiver is configured to receive the data based on the internal clock signal.

5. The display control method of claim 1, wherein the internal clock signal is generated based on at least one of two pixel clocks (PCLKs), three PCLKs, four PCLKs, or five PCLKs among clocks of the feedback data.

6. A display control device comprising:

a data transmitter configured to transmit a command for sensing to a driver integrated circuit (DIC);

a data receiver configured to receive feedback data including a transfer start indicator from the DIC; and an internal clock signal generator configured to generate an internal clock signal and shift a phase of the internal clock signal, wherein the transfer start indicator of the feedback data is checked based on the phase- shifted internal clock signal, wherein the data receiver and the internal clock signal generator are configured to repeat the reception of the feedback data and the phase shift of the internal clock signal, respectively, for a predetermined number of times, and wherein the display control device determines a center value of the internal clock signal from among values corresponding a number of times that the transfer start indicator is received while the reception and the phase shift are repeated for the predetermined number of times.

7. The display control device of claim 6, wherein an initial mode for determining the center value of the internal clock signal transitions to a normal mode after the determination of the center value, and wherein the display control device is configured to receive data from the DIC based on the internal clock signal corresponding to the center value in the normal mode without an external clock signal.

8. The display control device of claim 6, wherein the phase of the internal clock signal is shifted by an angle obtained by dividing 360 degrees by a value corresponding to the predetermined number of times, wherein the value of the predetermined number of times is determined based on a number of bits for an interface of the display control device, wherein the feedback data is received each time the phase of the internal clock signal is shifted, and wherein the center value of the internal clock signal is checked by checking whether there is a value in the transfer start indicator each time the feedback data is received.

9. The display control device of claim 6, wherein the display control device is configured to receive only data from the DIC and does not receive clock signals from the DIC, and wherein the display control device is configured to receive the data based on the internal clock signal.

10. The display control device of claim 6, wherein the internal clock signal is generated based on at least one of two pixel clocks (PCLKs), three PCLKs, four PCLKs, or five PCLKs among clocks of the feedback data.

11. A display system comprising:

a timing controller; and a driver integrated circuit (DIC), wherein the timing controller is configured to: transmit a command for sensing to the DIC, receive feedback data including a transfer start indicator from the DIC, and generate an internal clock signal and shift a phase of the internal clock signal;

wherein the transfer start indicator of the feedback data is checked based on the phase- shifted internal clock signal, wherein the reception of the feedback data and the shifting of the phase of the internal clock signal are repeated for a predetermined number of times, and wherein a center value of the internal clock signal is determined from among values corresponding to a number of times that the transfer start indicator is received during the repetition for the predetermined number of times.

12. The display system of claim 11, wherein the timing controller includes only an internal clock signal generator to generate an internal clock signal without generating an external clock signal.

13. The display system of claim 11, wherein the timing controller is further configured to detect the center value of the internal clock signal when a power of the timing controller is derived based on an initial mode.

14. The display system of claim 11, wherein the timing controller is further configured to transmit sensing command data for an initial mode to the DIC, and transmit sensing command data for a normal mode to the DIC.

15. The display system of claim 14, wherein the DIC is configured to transmit sensing data to the timing controller in response to reception of the sensing command data for the initial mode.

16. The display system of claim 11, wherein a route carrying a clock between the timing controller and the DIC is locked.

17. The display system of claim 11, wherein the phase of the internal clock signal is determined based on a number of bits of an interface between the timing controller and the DIC, wherein the feedback data is received each time the phase of the internal clock signal is shifted, and wherein the center value of the internal clock signal is checked by checking whether a value of the transfer start indicator is present whenever each feedback data is received.

18. The display system of claim 17, wherein after the determination of the center value:

an internal clock signal for the center value is set to a clock for a normal mode, and an initial mode for determining the center value of the internal clock signal is converted into a normal mode.

19. The display system of claim 11, wherein the feedback data that the timing controller receives from the DIC includes the transfer indicator and data following the transfer indicator.

20. The display system of claim 11, wherein the timing controller includes a plurality of initial modes based on the internal clock signal.

* * * * *